United States Patent
Takagi

(10) Patent No.: US 12,495,210 B2
(45) Date of Patent: Dec. 9, 2025

(54) SENSOR STRUCTURE OF IMAGE SHAKE CORRECTING DEVICE, AND IMAGING APPARATUS

(71) Applicant: FUJIFILM Corporation, Tokyo (JP)

(72) Inventor: Masaaki Takagi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 18/485,331

(22) Filed: Oct. 12, 2023

(65) Prior Publication Data
US 2024/0129628 A1   Apr. 18, 2024

(30) Foreign Application Priority Data
Oct. 14, 2022 (JP) ................... 2022-165548

(51) Int. Cl.
*H04N 23/68* (2023.01)
*H04N 23/50* (2023.01)

(52) U.S. Cl.
CPC ......... *H04N 23/6812* (2023.01); *H04N 23/50* (2023.01)

(58) Field of Classification Search
None
See application file for complete search history.

(56) References Cited

U.S. PATENT DOCUMENTS

| | | | |
|---|---|---|---|
| 2018/0316863 A1 | 11/2018 | Iseno | |
| 2020/0112680 A1* | 4/2020 | Shiraishi | G02B 27/646 |
| 2020/0314341 A1* | 10/2020 | Itagaki | G01C 19/56 |

FOREIGN PATENT DOCUMENTS

| | | |
|---|---|---|
| JP | 2005181463 | 7/2005 |
| JP | 2020201381 A * | 12/2020 |
| JP | 6942517 | 9/2021 |

* cited by examiner

*Primary Examiner* — Rodney E Fuller
(74) *Attorney, Agent, or Firm* — JCIPRNET

(57) ABSTRACT

A sensor unit includes: a support member; first to third vibration damping members disposed on the support member; and a flexible print substrate including first to third sensor parts that detect information related to an image shake, in which the first vibration damping member has a hole portion, and the first vibration damping member is disposed such that at least a part of the first vibration damping member overlaps the first sensor part in a projection direction of the first sensor part.

14 Claims, 13 Drawing Sheets

SENSOR STRUCTURE OF IMAGE SHAKE CORRECTING DEVICE, AND IMAGING APPARATUS

CROSS-REFERENCE TO RELATED APPLICATIONS

This application claims priority under 35 U.S.C § 119(a) to Japanese Patent Application No. 2022-165548 filed on 14 Oct. 2022. The above application is hereby expressly incorporated by reference, in its entirety, into the present application.

BACKGROUND OF THE INVENTION

1. Field of the Invention

The present invention relates to a sensor structure of an image shake correcting device and an imaging apparatus.

2. Description of the Related Art

An imaging apparatus disclosed in JP6942517B (corresponding to US2018/316863A1) includes an imaging element that captures a subject image formed by an imaging optical system, a grip portion having a shape that protrudes toward a subject side in an optical axis direction of the imaging optical system, a back-side exterior member disposed opposite to the subject side, a driving unit configured to drive in an inside of the imaging apparatus, a first holding portion that holds the driving unit, a first substrate comprising a control element that controls the imaging apparatus, an angular velocity detection unit that detects an angular velocity of a shake of the imaging apparatus, and a second holding portion that holds the angular velocity detection unit such that the angular velocity detection unit is disposed on a side opposite to the grip portion with respect to an optical axis of the imaging optical system viewed from the optical axis direction and on the subject side with respect to a space formed between the first substrate and the back-side exterior member in the optical axis direction.

An image shake sensor mounting device disclosed in JP2005-181463A is installed in a fixed portion in a lens barrel and comprises a gyro substrate on which a gyro sensor is mounted, and a rigid substrate to which the gyro substrate is adhered via a plurality of hanging rubbers, in which the hanging rubber absorbs high-frequency vibration transmitted to the rigid substrate, and prevents the high-frequency vibration from propagating to the gyro sensor.

SUMMARY OF THE INVENTION

One embodiment according to the technology of the present disclosure provides a sensor structure of an image shake correcting device and an imaging apparatus capable of suppressing propagation of unnecessary vibration to a sensor.

One aspect according to the technology of the present disclosure relates to a sensor structure of an image shake correcting device, comprising: a support member; a vibration damping member; and a detection member, in which the vibration damping member has a hole portion and/or a plurality of thick portions having different thicknesses in a first direction, and the vibration damping member is disposed such that at least a part of the vibration damping member overlaps the sensor part in a projection direction of the sensor part. The vibration damping member is disposed on the support member. The detection member includes a sensor part that detects information related to an image shake.

It is preferable that the information is information related to a posture change. It is preferable that the disposition is such that the vibration damping member overlaps an entirety of the sensor part in the projection direction.

It is preferable that the sensor part includes a first sensor part that detects information related to the image shake in a roll direction, a second sensor part that detects information related to the image shake in a pitch direction, and a third sensor part that detects information related to the image shake in a yaw direction.

It is preferable that the vibration damping member is disposed to overlap the first sensor part in a first projection direction, which is a projection direction of the first sensor part.

It is preferable that the support member includes a first plane on which the first sensor part is disposed and which is parallel to the roll direction, a second plane on which the second sensor part is disposed and which is orthogonal to the first plane and parallel to the pitch direction, and a third plane on which the third sensor part is disposed and which is orthogonal to the first plane and parallel to the yaw direction.

It is preferable that the detection member includes a first mounting portion on which the first sensor part is mounted and which is disposed parallel to the first plane, a second mounting portion on which the second sensor part is mounted and which is disposed parallel to the second plane, and a third mounting portion on which the third sensor part is mounted and which is disposed parallel to the third plane.

It is preferable that the detection member has a relay portion that connects the first mounting portion and the second mounting portion and/or connects the first mounting portion and the third mounting portion. It is preferable that, in the detection member, the relay portion is disposed at a position passing through the hole portion.

It is preferable that the hole portion is disposed in at least one of four corner portions of an outer shape of the vibration damping member, in a region other than a region overlapping the sensor part in the projection direction. It is preferable that a shape of the hole portion is an R-shape and/or a square shape. It is preferable that the detection member is a flexible print substrate.

It is preferable that a maximum thick portion having a maximum thickness among the plurality of thick portions is located in the region overlapping the sensor part in the projection direction.

Another aspect according to the technology of the present disclosure relates to an imaging apparatus comprising: a grip portion including the sensor structure described above, and a wireless communication unit, in which the support member is a resin material, and the sensor structure and the wireless communication unit are disposed side by side in order from a bottom in a top-bottom direction of the imaging apparatus.

DESCRIPTION OF THE PREFERRED EMBODIMENTS

First Embodiment

Figure 1:
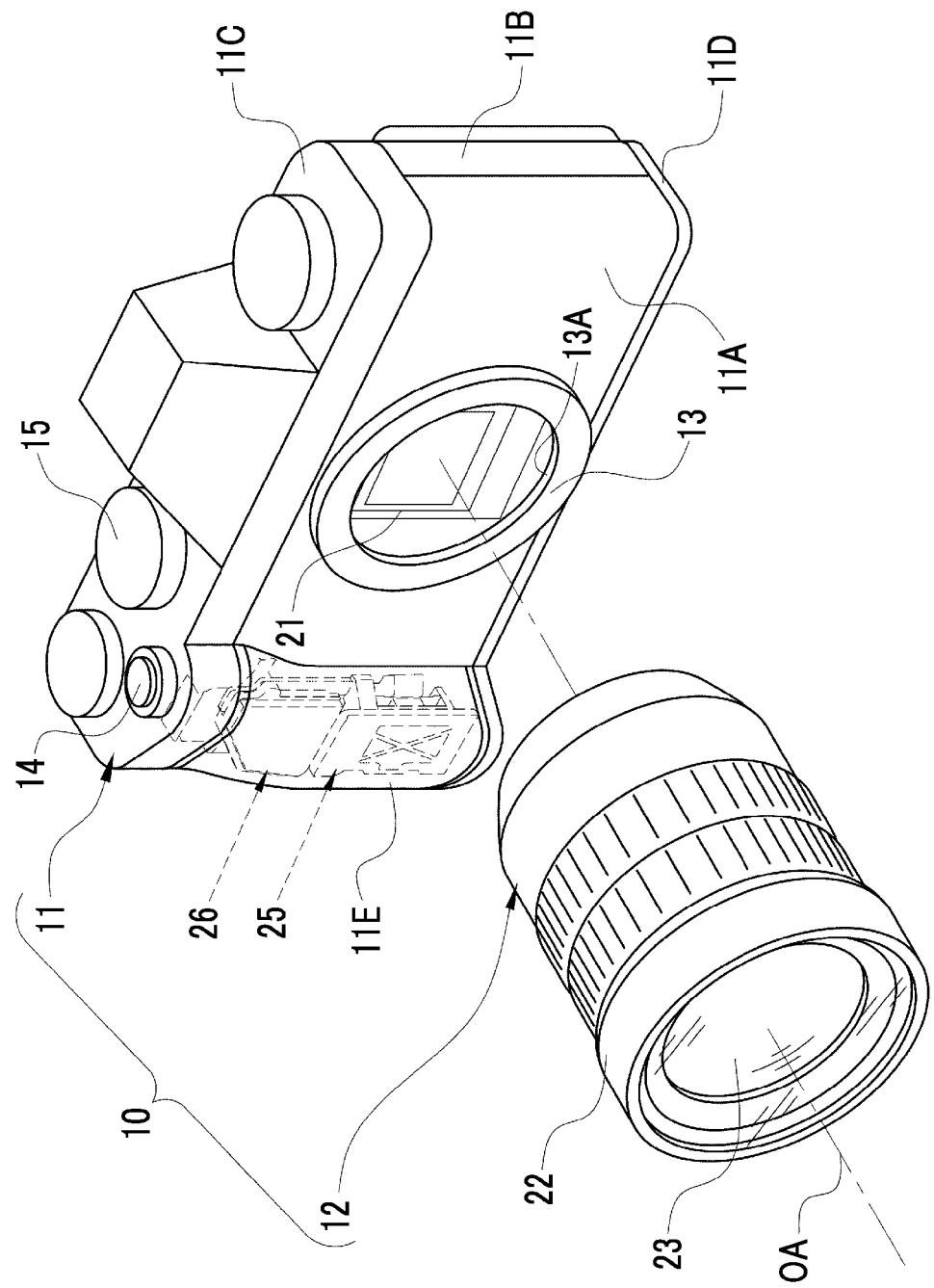
FIG. 1 is a front perspective view of an imaging apparatus.

As shown in FIG. 1, a digital camera 10 comprises a camera body 11 and an interchangeable lens barrel 12. A lens mount 13 is provided on a front surface of the camera body 11. The lens mount 13 has a circular imaging aperture 13A. The lens barrel 12 is attachably and detachably attached to the lens mount 13. In addition, a release switch 14, an operation dial 15, and the like are provided on an upper surface of the camera body 11. The digital camera 10 is an example of an imaging apparatus having a sensor structure of an image shake correcting device according to an embodiment of the present invention.

Figure 2:
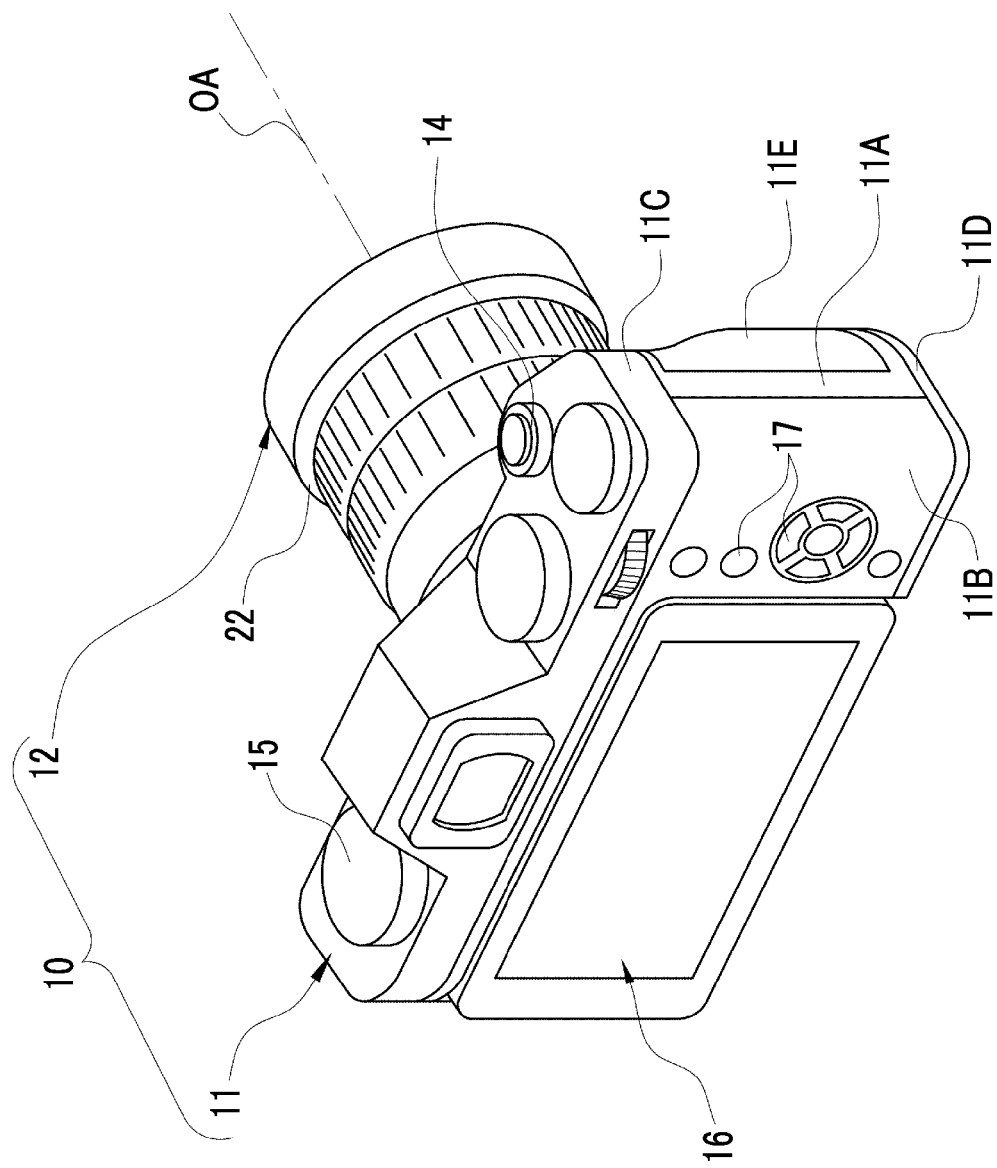
FIG. 2 is a back-side perspective view of the imaging apparatus.

As shown in FIG. 2, a display 16, an operation button 17, and the like are provided on a back surface of the camera body 11. The display 16 is a liquid crystal display (LCD), an organic electroluminescent display (OELD), or the like. The display 16 is used for displaying a live view image, displaying a captured image, displaying a setting menu, and the like.

An imaging element 21 is built in the camera body 11. The imaging element 21 is, for example, a complementary metal oxide semiconductor (CMOS) image sensor, a charge coupled device (CCD) image sensor, or an organic thin film imaging element.

The lens barrel 12 comprises a lens barrel body 22, an imaging optical system 23, and the like. The lens barrel body 22 has a cylindrical shape and holds the imaging optical system 23 therein, and is provided with a lens mount and a lens-side signal contact (not shown) at a rear end thereof. The imaging optical system 23 images subject light on the imaging element 21 in a case in which the lens barrel 12 is attached to the camera body 11.

The camera body 11 has a front case 11A, a rear case 11B, a top case 11C, a bottom case 11D, and a grip cover 11E. The front case 11A, the rear case 11B, the top case 11C, and the bottom case 11D are combined to form an exterior case of the camera body 11. The grip cover 11E is mounted to a front surface side of the front case 11A. The grip cover 11E constitutes a grip portion of the camera body 11 together with the front case 11A and the rear case 11B.

Figure 3:
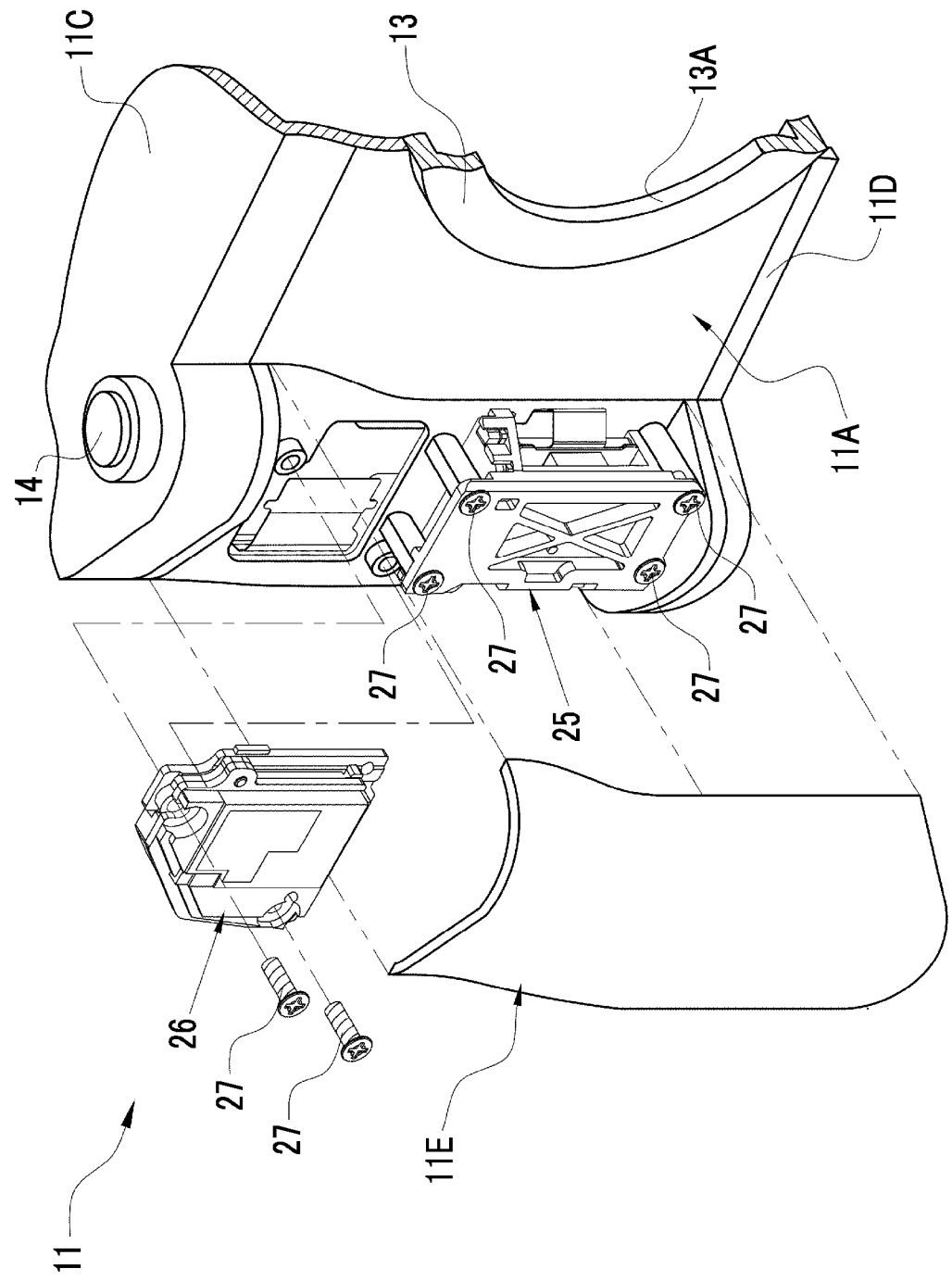
FIG. 3 is an exploded perspective view of a periphery of a grip of the imaging apparatus.

As shown in FIG. 3, a sensor unit 25 and a wireless local area network (LAN) unit 26 are built in the camera body 11. Specifically, the sensor unit 25 and the wireless LAN unit 26 are disposed in the grip portion of the camera body 11, that is, in a space interposed between the front case 11A and the grip cover 11E. The wireless LAN unit 26 corresponds to a wireless communication unit in the scope of the claims. The sensor unit 25 and the wireless LAN unit 26 are fixed to the front case 11A by, for example, fastening with a screw member 27.

Figure 4:
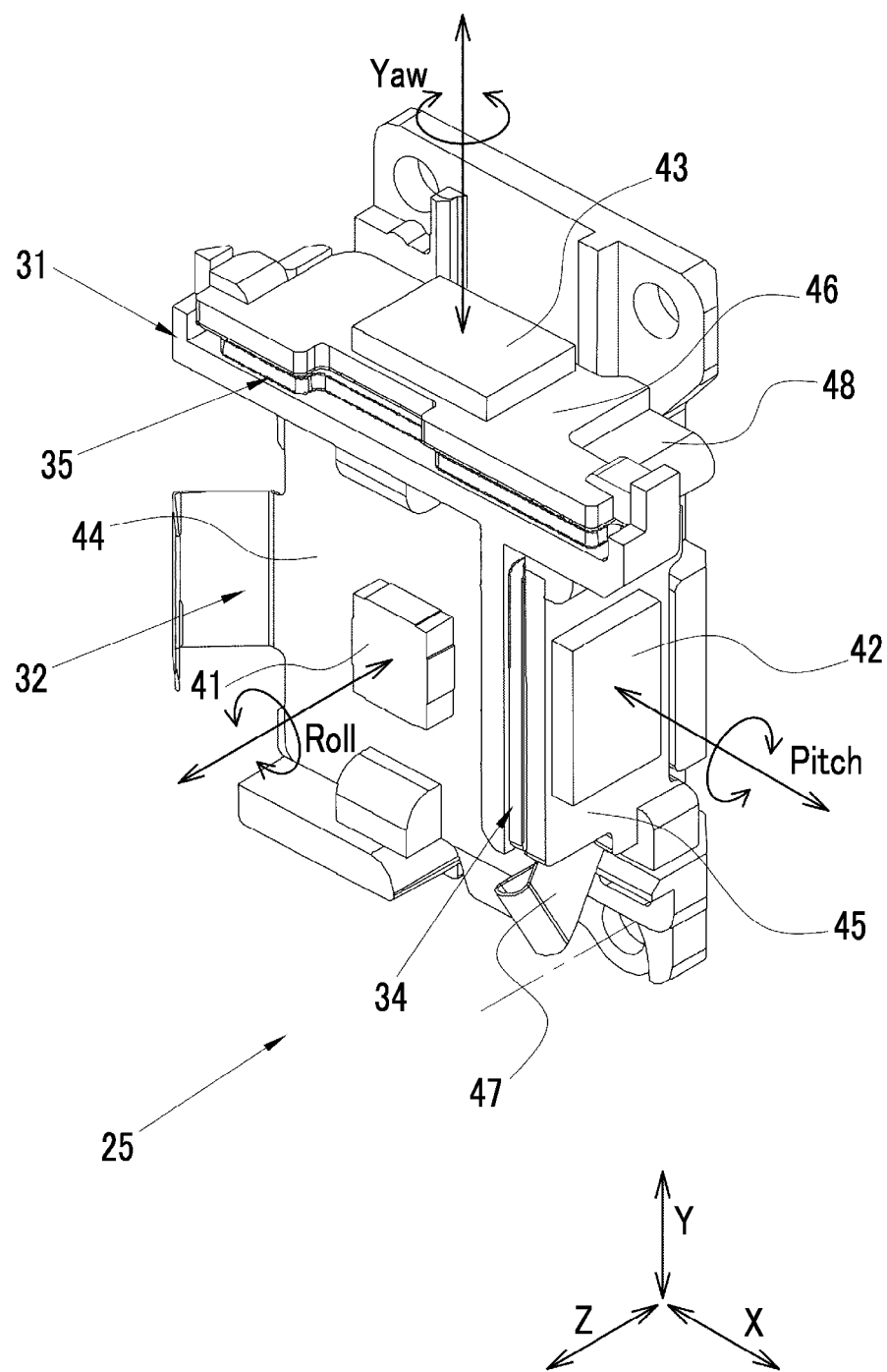
FIG. 4 is a perspective view of a sensor structure according to an aspect of the present invention.

As shown in FIG. 4, the sensor structure according to the embodiment of the present invention is applied to the sensor unit 25. The sensor unit 25 comprises a support member 31, a flexible print substrate 32, a first vibration damping member 33 (see FIG. 5), a second vibration damping member 34, and a third vibration damping member 35. The flexible print substrate 32 comprises first to third sensor parts 41 to 43, first to third mounting portions 44 to 46, and first and second relay portions 47 and 48. The flexible print substrate 32 corresponds to a detection member in the scope of the claims. The first to third sensor parts 41 to 43 correspond to a sensor part in the scope of the claims.

Figure 5:
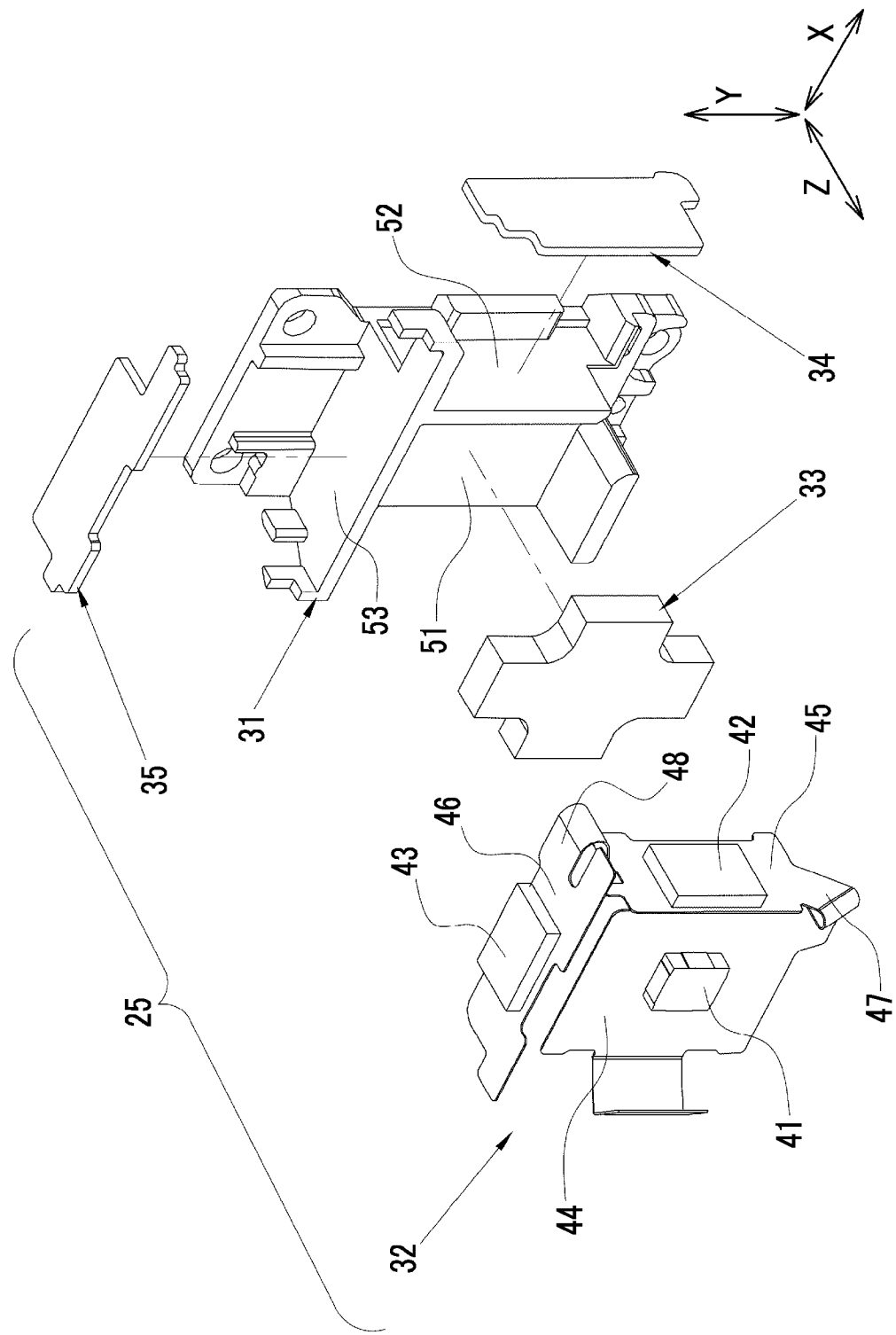
FIG. 5 is an exploded perspective view of the sensor structure.

As shown in FIG. 5, the first sensor part 41 is mounted on the first mounting portion 44, the second sensor part 42 is mounted on the second mounting portion 45, and the third sensor part 43 is mounted on the third mounting portion 46. The first to third mounting portions 44 to 46 are a part of the flexible print substrate 32 and are formed in a quadrangular shape.

Figure 6:
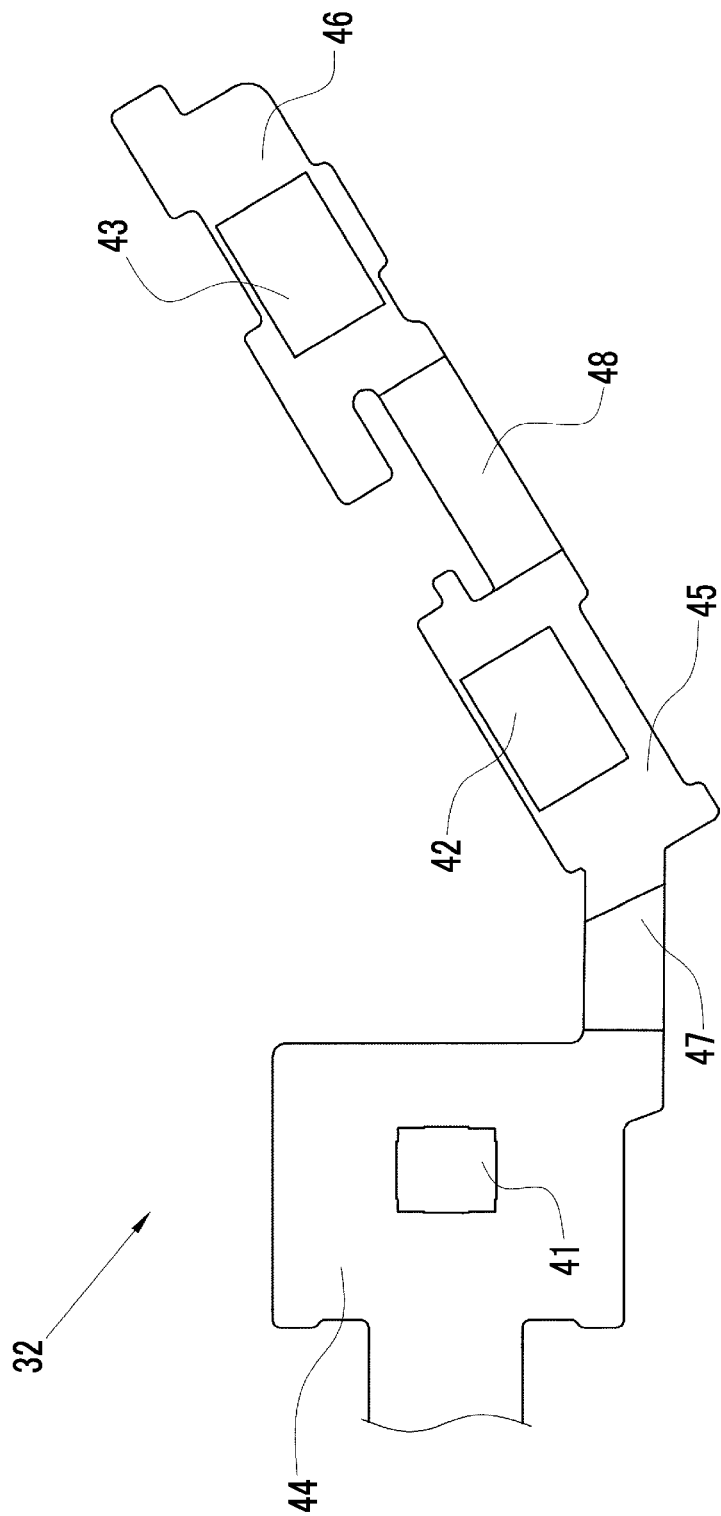
FIG. 6 is a plan view of a flexible print substrate before being mounted to a support member.

As shown in FIG. 6, in a state before the flexible print substrate 32 is mounted to the support member 31, the first to third mounting portions 44 to 46 and the first and second relay portions 47 and 48 are formed in a continuous planar shape. The first relay portion 47 connects the first mounting portion 44 and the second mounting portion 45, and the second relay portion 48 connects the first mounting portion and the third mounting portion. The first and second relay portions 47 and 48 are formed in a quadrangular shape having a width smaller than that of the first to third mounting portions 44 to 46, and are easily bent.

In the flexible print substrate 32, by bending the first and second relay portions 47 and 48, a positional relationship is obtained in which the second mounting portion 45 is orthogonal to the first mounting portion 44, and the third mounting portion 46 is orthogonal to the first and second mounting portions 44 and 45 (state shown in FIG. 5). Although a part of the flexible print substrate 32 in the drawing is omitted in order to prevent complication, the flexible print substrate 32 actually has a connecting part or the like that connects the wireless LAN unit 26 and/or a controller (not shown).

The support member 31 has a shape in which a plurality of plate-shaped portions are combined, and has first to third planes 51 to 53. The support member 31 is formed of a resin material. The first plane 51 is a plane parallel to a roll direction Roll, the second plane 52 is a plane parallel to a pitch direction Pitch, and the third plane 53 is a plane parallel to a yaw direction Yaw.

The flexible print substrate 32 is supported by the support member 31 in the positional relationship in which the second mounting portion 45 is orthogonal to the first mounting portion 44, and the third mounting portion 46 is orthogonal to the first and second mounting portions 44 and 45 by bending the first and second relay portions 47 and 48 as described above. That is, the first mounting portion 44 is disposed parallel to the first plane 51, the second mounting portion 45 is disposed parallel to the second plane 52, and the third mounting portion 46 is disposed parallel to the third plane 53. By disposing the flexible print substrate 32 with respect to the support member 31 in this manner, the first sensor part 41 is disposed on the first plane 51, the second sensor part 42 is disposed on the second plane 52, and the third sensor part 43 is disposed on the third plane 53.

The first to third vibration damping members 33 to 35 are disposed to be interposed between the support member 31 and the flexible print substrate 32. Specifically, the first vibration damping member 33 is disposed between the first mounting portion 44 and the first plane 51, the second vibration damping member 34 is disposed between the second mounting portion 45 and the second plane 52, and the third vibration damping member 35 is disposed between the third mounting portion 46 and the third plane 53. Accordingly, the first to third vibration damping members 33 to 35 suppress the propagation of vibration with respect to the first to third sensor parts 41 to 43. The first to third vibration damping members 33 to 35 need only be a member that suppress the propagation of vibration, such as a soft resin member, a rubber member, and a foamed member.

As described above, the flexible print substrate 32 and the first to third vibration damping members 33 to 35 disposed with respect to the support member 31 are mounted to the support member 31 by being stuck to the support member 31, for example, by application of an adhesive (not shown).

The first to third sensor parts 41 to 43 are sensors that detect information related to an image shake, and for example, a gyro sensor is used. In addition, the information related to the image shake detected by the first to third sensor parts 41 to 43 is information related to a posture change. Specifically, the first sensor part 41 detects information related to the image shake in the roll direction Roll, the second sensor part 42 detects information related to the image shake in the pitch direction Pitch, and the third sensor part 43 detects information related to the image shake in the yaw direction Yaw. The roll direction Roll is a direction of rotation in a plane orthogonal to a Z direction, the pitch direction Pitch is a direction of rotation in a plane orthogonal to an X direction, and the yaw direction Yaw is a direction of rotation in a plane orthogonal to a Y direction.

In addition, the Z direction is a direction parallel to an optical axis OA (see FIGS. 1 and 2) of the imaging optical system 23, and the Y direction is a direction orthogonal to the Z direction and is a top-bottom direction of the digital camera 10 in the present embodiment. In addition, the X direction is a direction orthogonal to the Z direction and the Y direction, and is a left-right direction of the digital camera 10 in the present embodiment. In the present specification, the word "orthogonal" includes not only the meaning of "perfectly orthogonal" but also the meaning of "substantially orthogonal" including errors allowed in design and manufacturing. The word "parallel" includes not only the meaning of "perfectly parallel" but also the meaning of "substantially parallel" including errors allowed in design and manufacturing.

The first to third sensor parts 41 to 43 are formed in a plate shape whose outer shape is quadrangular, and are disposed at centers of the first to third mounting portions 44 to 46, respectively.

Figure 7:
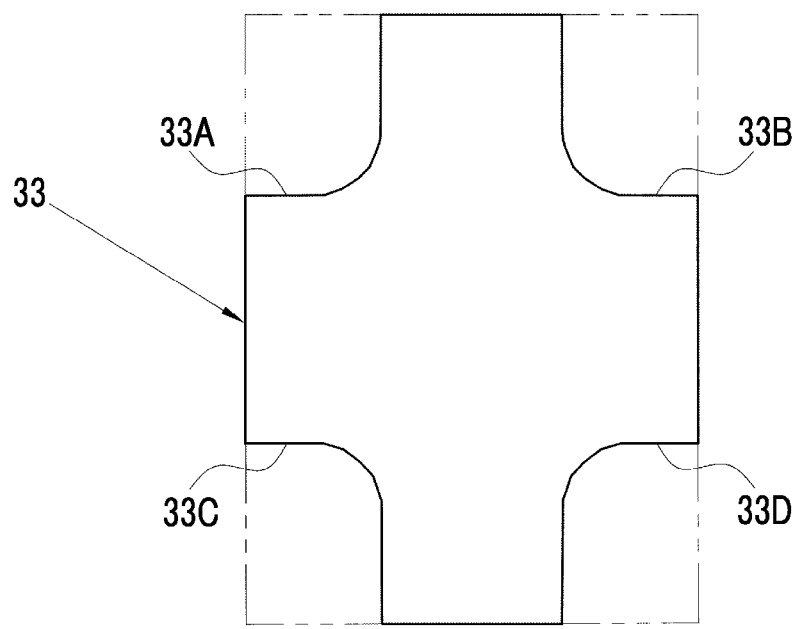
FIG. 7 is a back view of a first vibration damping member.

As shown in FIG. 7, the first vibration damping member 33 is formed in a plate shape having hole portions 33A to 33D at four corners of a quadrangle. The hole portions 33A to 33D have a square shape. That is, the first vibration damping member 33 has a shape obtained by cutting four corners into a square shape from the outer shape of the quadrangle, and the first vibration damping member 33 has a substantially cross outer shape. A two-dot chain line in the drawing is an imaginary line in a case in which the hole portions 33A to 33D are not provided, that is, in a case in which the outer shape is quadrangular.

Figure 8:
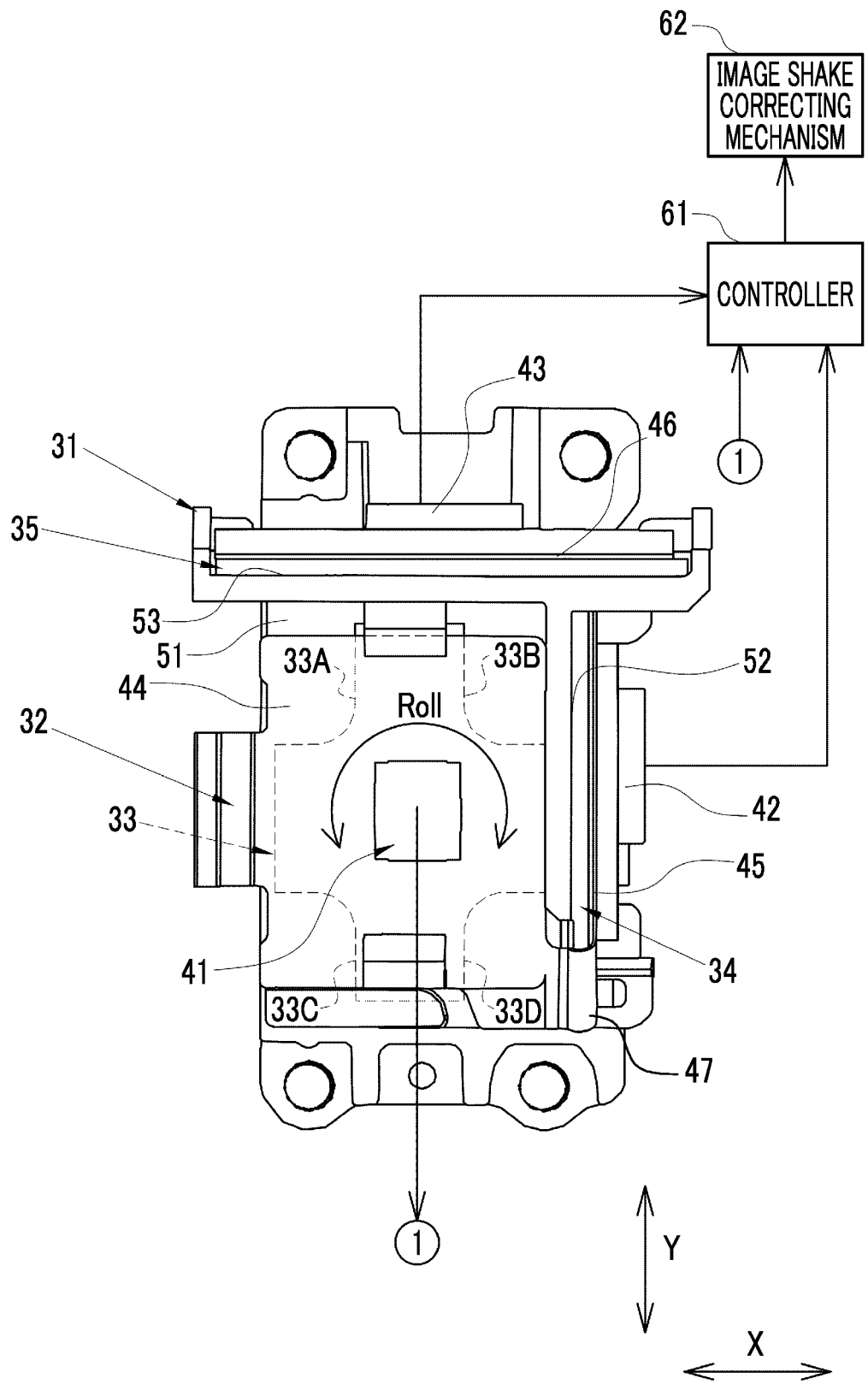
FIG. 8 is a back view of the sensor structure.

As shown in FIG. 8, the first vibration damping member 33 is disposed such that at least a part thereof overlaps with the first sensor part 41 in a projection direction of the first sensor part 41. Here, the projection direction of the first sensor part 41 is the Z direction orthogonal to the roll direction Roll. In the present embodiment, in a case in which the first vibration damping member 33 is viewed in the Z direction, the first sensor part 41 is located at the center of the first vibration damping member 33, and the first vibration damping member 33 overlaps the entirety of the first sensor part 41. In other words, in a case in which the first vibration damping member 33 is viewed in the Z direction, positions of the hole portions 33A to 33D do not overlap a position of the first sensor part 41. Accordingly, since the hole portions 33A to 33D are provided, the limitation on the movement of the first sensor part 41 is reduced. That is, the first sensor part 41 is likely to rock in the roll direction Roll. A projection direction of the second sensor part 42 is the X direction orthogonal to the pitch direction Pitch, and a projection direction of the third sensor part 43 is the Y direction orthogonal to the yaw direction Yaw.

The first to third sensor parts 41 to 43 are connected to a controller 61. The controller 61 is a central processing unit (CPU), and is a general-purpose processor that executes software (program) to function as various processing units. The controller 61 controls an operation of each part of the digital camera 10 including an image shake correcting mechanism 62 and the imaging element 21. The image shake correcting mechanism 62 corresponds to an image shake correcting device in the scope of the claims.

The image shake correcting mechanism 62 moves the imaging element 21 based on the control of the controller 61. For example, the image shake correcting mechanism 62 moves the imaging element 21 in the X direction and the Y direction by an amount for cancelling the shake in a direction of cancelling the shake, and rotates the imaging element 21 in the roll direction Roll, the pitch direction Pitch, and the yaw direction Yaw.

In addition, in the flexible print substrate 32, the first relay portion 47 is disposed at a position passing through the hole portion 33D. Here, the phrase "position passing through" means that the first relay portion 47 is located inside or near the hole portion 33D. Accordingly, the first relay portion 47 does not hinder the movement of the first mounting portion 44. In addition, although not shown, the second relay portion 48 is similarly disposed at a position passing through the hole portion 33B.

Figure 9:
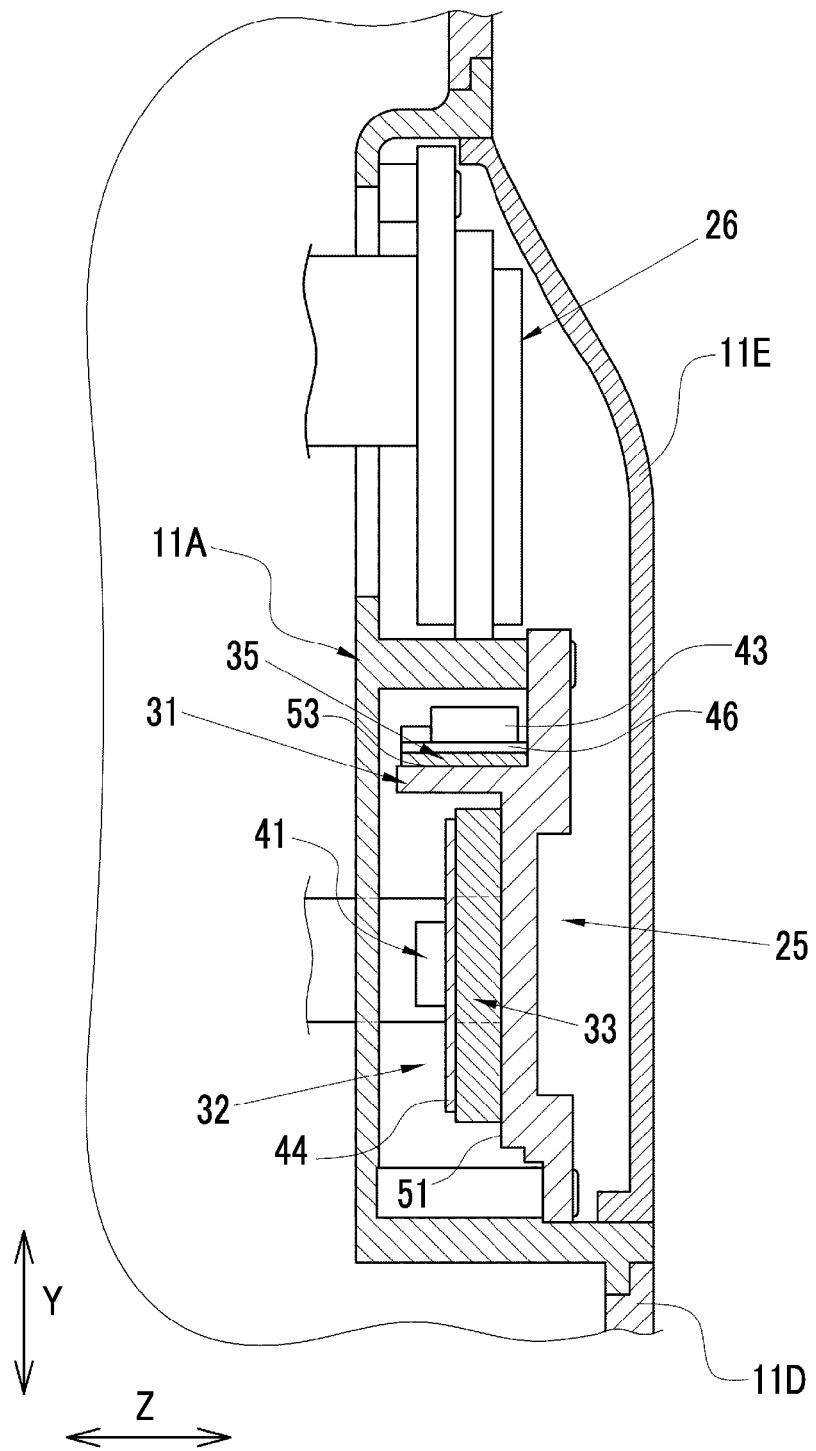
FIG. 9 is a cross-sectional view of a main part of the present invention.

As shown in FIG. 9, the sensor unit 25 and the wireless LAN unit 26 are disposed side by side in order from the bottom in the Y direction of the digital camera 10. As described above, the sensor unit 25 and the wireless LAN unit 26 are disposed in the grip portion of the camera body 11. The grip portion of the camera body 11 has no space in a front-rear direction, and the sensor unit 25 is thicker than the wireless LAN unit 26, so that the sensor unit 25 and the wireless LAN unit 26 are disposed in the order described above.

The wireless LAN unit 26 is a wireless communication unit that performs transmission and reception of data between a plurality of devices by wireless communication using radio waves. In a case in which there is a metal member in close proximity to the wireless LAN unit 26, the metal member may interfere with the transmitted and received radio waves, resulting in the attenuation of the radio waves, but in the present embodiment, the support member 31, which is located in close proximity to the wireless LAN unit 26 and has a large volume and area, does not interfere with the radio waves because it is made of a resin material.

Next, an action of the digital camera 10 according to the present embodiment will be described. The power of the digital camera 10 is turned on, and each part is operated to perform imaging. In a case in which vibration is generated due to a camera shake or the like of a user holding the grip portion of the camera body 11, the first to third sensor parts 41 to 43 detect information related to an image shake, that is, information related to a posture change. The detected information related to the image shake is transmitted to the controller 61, and the controller 61 controls the image shake correcting mechanism 62 to perform feedback control of driving the imaging element 21 in a direction of eliminating the image shake. In this case, in the digital camera 10, vibration due to the operation of a shutter mechanism (not shown) and/or the image shake correcting mechanism 62, and unnecessary vibration due to collision from an outside of the digital camera 10 or the like are generated.

In a case in which, as in the sensor structure in the related art, there are no hole portions at four corners of the vibration damping member (in a case of a shape including the two-dot chain line in FIG. 7), vibration is transmitted from the support member to the sensor part by the amount of the absence of the hole portions. In this case, vibration due to the operation of the shutter mechanism and/or the image shake correcting mechanism, and unnecessary vibration due to collision or the like propagate through the vibration damping member, and the vibration is transmitted to the sensor. For this reason, the sensor of the image shake correcting device in the related art cannot detect the information related to the image shake with high accuracy. In addition, in a case in which a size of the vibration damping member is made large in order to suppress unnecessary vibration, a size of the entire device becomes large, which hinders miniaturization.

On the other hand, in the sensor structure of the present embodiment, the first vibration damping member 33 has a shape having the hole portions 33A to 33D at four corners, and the first vibration damping member 33 is disposed such that at least a part thereof overlaps the first sensor part 41 in the projection direction. Accordingly, the first sensor part 41 is likely to rock in the roll direction Roll. The first sensor part 41 can suppress the propagation of unnecessary vibration to the first sensor part 41 in a case in which an image shake occurs, that is, in a case in which the camera body 11 rocks in the roll direction Roll. That is, the first sensor part 41 can detect the information related to the image shake with high accuracy. In the present embodiment, the first sensor part 41 can detect the information related to the image shake in the roll direction Roll with high accuracy. In addition, unlike the sensor structure in the related art, it is not necessary to increase the size of the vibration damping member, so that the entire device including the sensor unit 25 can be miniaturized.

In addition, in the flexible print substrate 32 of the sensor unit 25, the first relay portion 47 is disposed at a position passing through the hole portion 33D. Accordingly, the first relay portion 47 does not hinder the movement of the first mounting portion 44. Therefore, the first sensor part 41 is likely to rock in the roll direction Roll, and can detect the information related to the image shake with higher accuracy.

In the embodiment described above, only the first vibration damping member 33 has the hole portions 33A to 33D at four corners, and the first vibration damping member 33 is disposed such that at least a part thereof overlaps the first sensor part 41 in the projection direction, but the present invention is not limited to this. The second vibration damping member 34 and the third vibration damping member 35 may similarly have hole portions at four corners, and the second vibration damping member 34 may be disposed such that at least a part thereof overlaps the second sensor part 42 in the projection direction, and/or the third vibration damping member 35 may be disposed such that at least a part thereof overlaps the third sensor part 43 in the projection direction. In this case, the second sensor part 42 can detect the information related to the image shake in the pitch direction Pitch with high accuracy, and the third sensor part 43 can detect the information related to the image shake in the yaw direction Yaw with high accuracy.

Second Embodiment

In the first embodiment described above, the vibration damping member has a shape having the hole portions at four corners, and is disposed such that at least a part thereof overlaps the sensor part in the projection direction, but the present invention is not limited to this. In a second embodiment described below, the vibration damping member has a plurality of thick portions having different thicknesses in a first direction, and is disposed such that at least a part thereof overlaps the sensor part in the projection direction.

Figure 10:
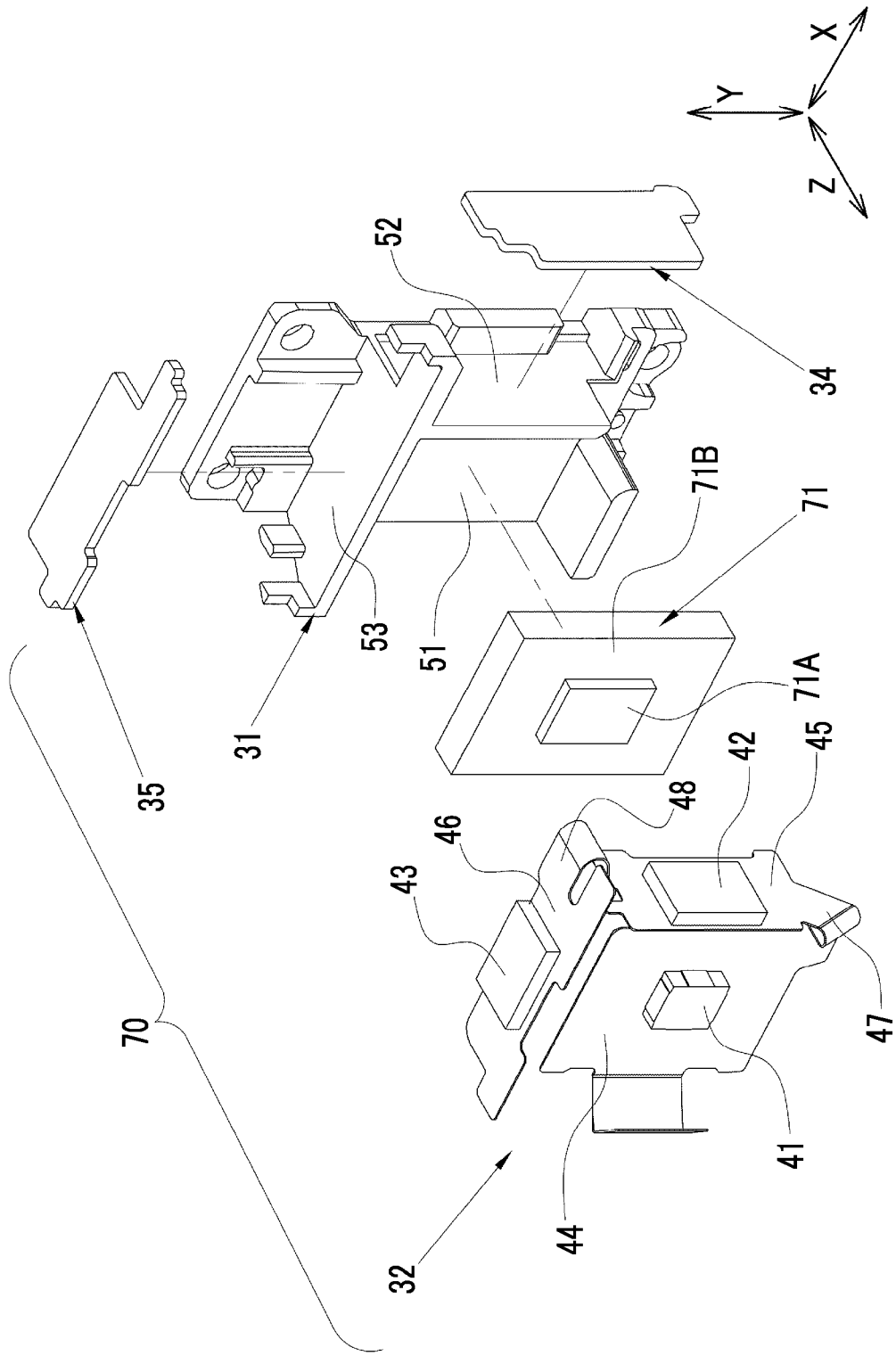
FIG. 10 is an exploded perspective view of a sensor structure in a second embodiment.

As shown in FIG. 10, a sensor unit 70 of the present embodiment comprises a support member 31, a flexible print substrate 32, a first vibration damping member 71, a second vibration damping member 34, and a third vibration damping member 35. The same components and members as those in the first embodiment are denoted by the same reference numerals, and the description thereof will be omitted.

The first vibration damping member 71 is formed in a quadrangular plate shape having a maximum thick portion 71A in a central portion. The first vibration damping member 71 has a thickness different between the maximum thick portion 71A and a thick portion 71B which is a portion other than the maximum thick portion 71A. The thickness referred to here refers to a dimension of the first vibration damping member 71 in the Z direction. In the present embodiment, the first vibration damping member 71 has only two thick portions, that is, the maximum thick portion 71A and the thick portion 71B, but there may be three or more thick portions having different thicknesses.

Figure 11:
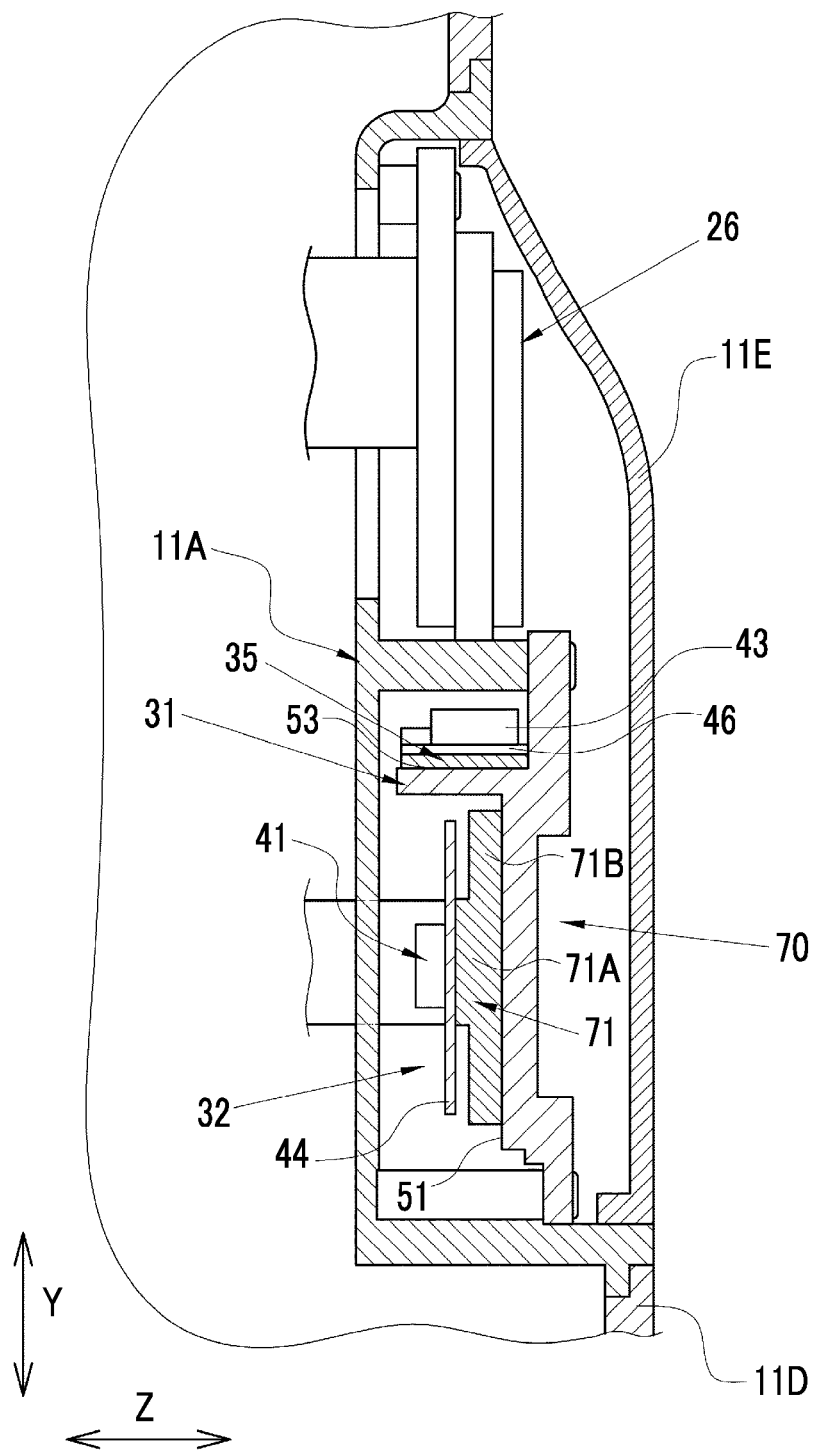
FIG. 11 is a cross-sectional view of a main part of the sensor structure in the second embodiment.

As shown in FIG. 11, the first vibration damping member 71 is disposed such that at least a part thereof overlaps with the first sensor part 41 in a projection direction of the first sensor part 41. The projection direction of the first sensor part 41 is the Z direction as in the first embodiment.

Figure 12:
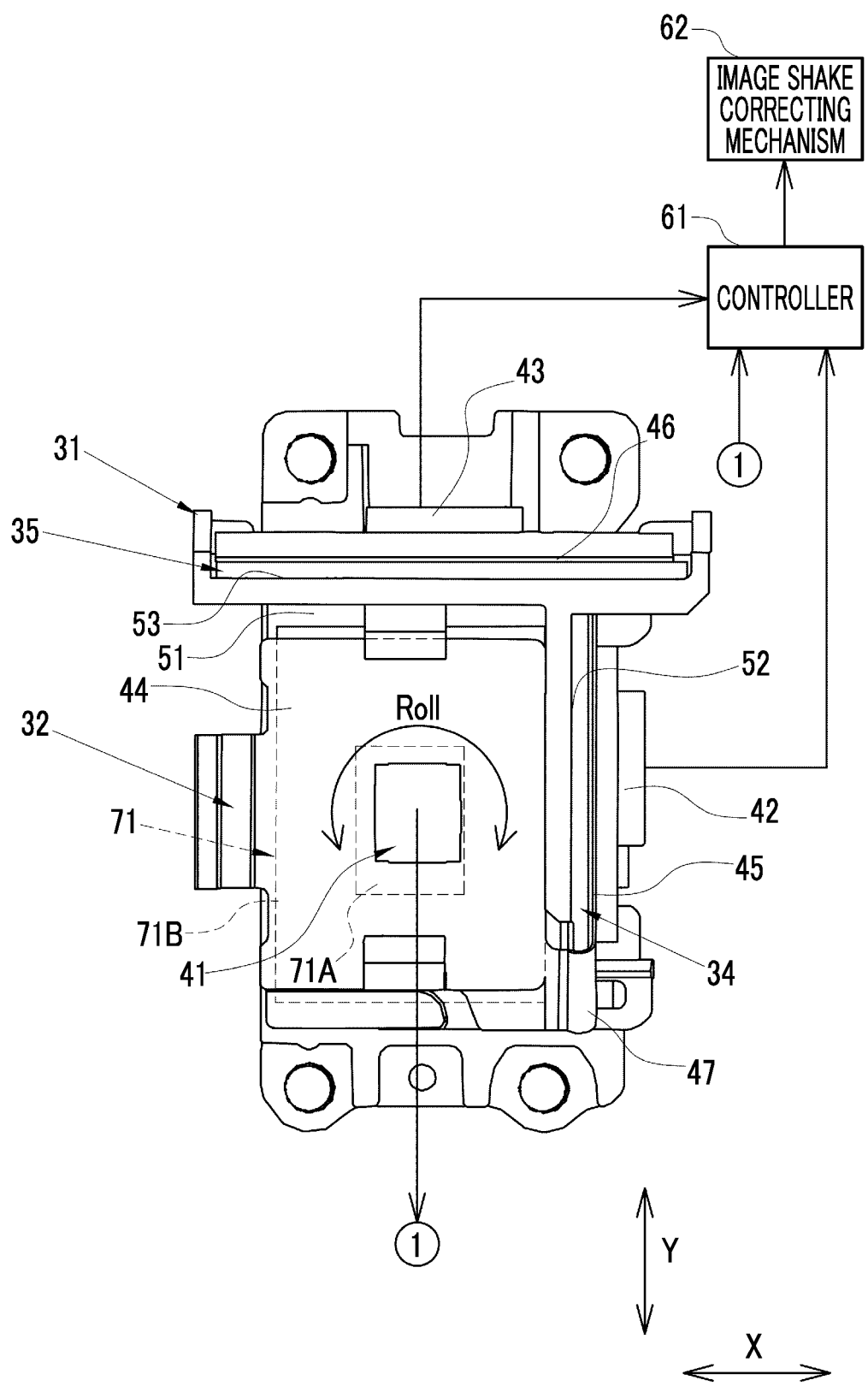
FIG. 12 is a back view of the sensor structure in the second embodiment.

As shown in FIG. 12, in the present embodiment, in a case in which the first vibration damping member 71 is viewed in the Z direction, the maximum thick portion 71A, out of the maximum thick portion 71A and the thick portion 71B of the first vibration damping member 71, is located at a region overlapping the first sensor part 41. Accordingly, since the thickness of the thick portion 71B, which is a portion other than the maximum thick portion 71A, is small, the limitation on the movement of the first sensor part 41 is reduced. That is, the first sensor part 41 is likely to rock in the roll direction Roll.

As in the first embodiment, in a case in which each part of the digital camera 10 is operated to perform imaging, and vibration is generated due to a camera shake or the like of a user holding the grip portion of the camera body 11, the first to third sensor parts 41 to 43 detect information related to an image shake, that is, information related to a posture change.

In the sensor structure of the present embodiment, the first vibration damping member 71 has a shape having the maximum thick portion 71A and the thick portion 71B having different thicknesses in the Z direction, and the first vibration damping member 71 is disposed such that at least a part thereof overlaps the first sensor part 41 in the projection direction. Since there is a difference in the thickness of the first vibration damping member 71 in the Z direction, the first sensor part 41 is likely to rock in the roll direction Roll. That is, as in the first embodiment, in a case in which the image shake occurs, the first sensor part 41 can suppress the propagation of unnecessary vibration to the sensor. That is, the first sensor part 41 can detect the information related to the image shake with high accuracy. In the present embodiment, the first sensor part 41 can detect the information related to the image shake in the roll direction Roll with high accuracy. In addition, unlike the sensor structure in the related art, it is not necessary to increase the size of the vibration damping member, so that the entire device including the sensor unit 70 can be miniaturized.

In the second embodiment described above, only the first vibration damping member 71 has a plurality of thick portions having different thicknesses, and the first vibration damping member 71 is disposed such that at least a part thereof overlaps the first sensor part 41 in the projection direction, but the present invention is not limited to this. The second vibration damping member and the third vibration damping member may similarly have a plurality of thick portions having different thicknesses, and the second vibration damping member may be disposed such that at least a part thereof overlaps the second sensor part 42 in the projection direction, and/or the third vibration damping member may be disposed such that at least a part thereof overlaps the third sensor part 43 in the projection direction. In this case, as in the first embodiment, the second sensor part 42 can detect the information related to the image shake in the pitch direction Pitch with high accuracy, and the third sensor part 43 can detect the information related to the image shake in the yaw direction Yaw with high accuracy.

First Modification Example

Figure 13:
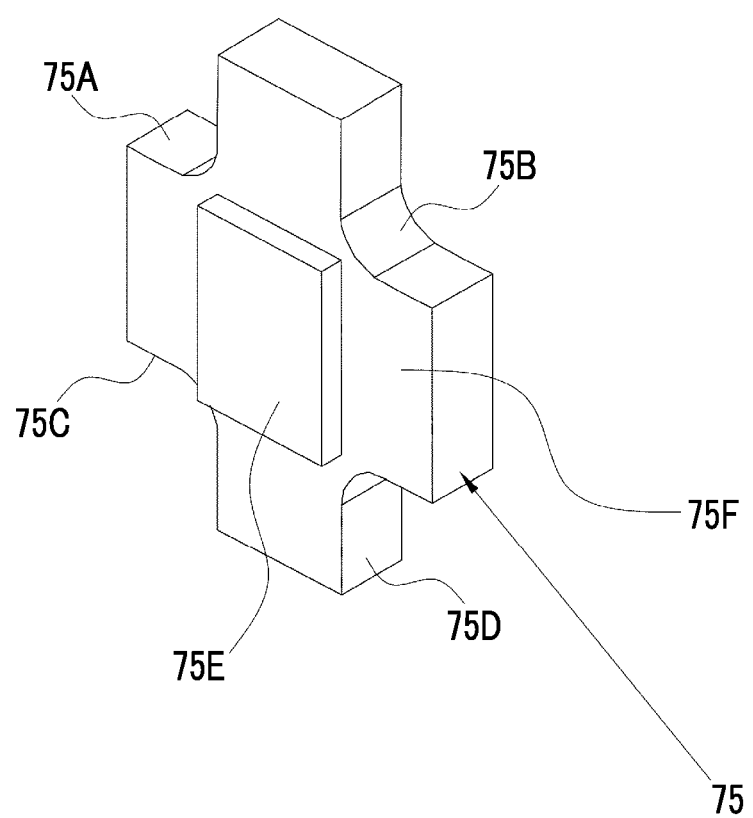
FIG. 13 is a perspective view of a vibration damping member in a first modification example.

In addition, the configuration of the first embodiment and the configuration of the second embodiment may be combined. In this case, as shown in FIG. 13, a first vibration damping member 75 has a plate shape having hole portions 75A to 75D at four corners of a quadrangle and has a maximum thick portion 75E. The first vibration damping member 75 has a thickness different between the maximum thick portion 75E and a thick portion 75F which is a portion other than the maximum thick portion 75E. Shapes of the hole portions 75A to 75D are the same as the shapes of the hole portions 33A to 33D of the first vibration damping member 33 in the first embodiment. The first vibration damping member 75 constitutes a sensor unit as in the first and second embodiments. Accordingly, it is possible to obtain the same effects as those of the first and second embodiments. In this case, the second vibration damping member and the third vibration damping member may have the same configuration as that of the first vibration damping member 75.

In each of the embodiments and the modification example, the first vibration damping members 33 and 75 are provided with the hole portions at four corners, but the present invention is not limited to this, and the hole portion need only be disposed in at least one of four corner portions of the outer shape of the first vibration damping member, in a region other than a region overlapping the first sensor part 41 in the projection direction (Z direction). The same applies to a case in which the hole portions are formed in the second vibration damping member and the third vibration damping member. In addition, in each of the embodiments and the modification example, the shape of the hole portion of the first vibration damping members 33 and 75 is a square shape, but the present invention is not limited to this, and the shape may be an R-shape, that is, a semicircular or arcuate shape.

In each of the embodiments, the controller 61 is exemplified as a processor for controlling the operation of the image shake correcting mechanism 62, but a processor as a hardware structure of a processing unit performing various types of processing, such as the controller 61, is not limited thereto. A graphical processing unit (GPU), a programmable logic device (PLD) that is a processor of which circuit configuration can be changed after manufacture, such as a field programmable gate array (FPGA), a dedicated electrical circuit that is a processor having circuit configuration designed exclusively to perform various types of processing, and the like are included in various processors instead of or in addition to a CPU.

One processing unit may be configured of one of these various processors, or may be configured of a combination of two or more processors of the same type or different types (for example, a plurality of FPGAs, a combination of a CPU and an FPGA, or a combination of a CPU and a GPU). In addition, a plurality of processing units may be configured of one processor. As an example in which the plurality of processing units are configured of one processor, first, as typified by computers such as a client or a server, one processor is configured of a combination of one or more CPUs and software, and this processor functions as the plurality of processing units. Second, as typified by a system on chip (SoC) or the like, a processor that realizes the functions of the entire system including the plurality of processing units by using one integrated circuit (IC) chip is used. As described above, the various processing units are configured using one or more of the various processors as a hardware structure.

Further, the hardware structure of these various processors is more specifically an electric circuit (circuitry) in a form in which circuit elements such as semiconductor elements are combined.

The dial according to the embodiment of the present invention is not limited to the operation dial of the digital camera, and can also be applied to the operation dial of an imaging apparatus such as a smartphone or a video camera.

EXPLANATION OF REFERENCES

10: digital camera
11: camera body
11A: front case
11B: rear case
11C: top case
11D: bottom case
11E: grip cover
12: lens barrel
13: lens mount
13A: imaging aperture
14: release switch 15: operation dial
16: display
17: operation button
21: imaging element
22: lens barrel body
23: imaging optical system
25: sensor unit
26: wireless local area network (LAN) unit
27: screw member
31: support member
32: flexible print substrate
33: first vibration damping member
33A to 33D: hole portion
34: second vibration damping member
35: third vibration damping member
41: first sensor part
42: second sensor part
43: third sensor part
44: first mounting portion
45: second mounting portion
46: third mounting portion
47: first relay portion
48: second relay portion
51: first plane
52: second plane
53: third plane
61: controller
62: image shake correcting mechanism
70: sensor unit
71: first vibration damping member
71A: maximum thick portion
71B: thick portion
75: first vibration damping member
75A to 75D: hole portion
75E: maximum thick portion
75F: thick portion
Pitch: pitch direction
Roll: roll direction
Yaw: yaw direction

What is claimed is:

1. A sensor structure of an image shake correcting device, comprising:
   a support member;
   a vibration damping member disposed on the support member; and
   a detection member including a sensor part that detects information related to an image shake,
   wherein the vibration damping member has a hole portion and/or a plurality of thick portions having different thicknesses in a first direction, and
   the vibration damping member is disposed such that at least a part of the vibration damping member overlaps the sensor part in a projection direction of the sensor part.

2. The sensor structure of an image shake correcting device according to claim 1,
   wherein the information is information related to a posture change.

3. The sensor structure of an image shake correcting device according to claim 1,
   wherein the disposition is such that the vibration damping member overlaps an entirety of the sensor part in the projection direction.

4. The sensor structure of an image shake correcting device according to claim 1,
   wherein the hole portion is disposed in at least one of four corner portions of an outer shape of the vibration damping member, in a region other than a region overlapping the sensor part in the projection direction.

5. The sensor structure of an image shake correcting device according to claim 4,
   wherein a shape of the hole portion is an R-shape and/or a square shape.

6. The sensor structure of an image shake correcting device according to claim 4,
   wherein the detection member is a flexible print substrate.

7. The sensor structure of an image shake correcting device according to claim 6,
   wherein a maximum thick portion having a maximum thickness among the plurality of thick portions is located in the region overlapping the sensor part in the projection direction.

8. An imaging apparatus comprising:
   a grip portion including:
      the sensor structure according to claim 1; and
      a wireless communication unit,
   wherein the support member is a resin material, and
   the sensor structure and the wireless communication unit are disposed side by side in order from a bottom in a top-bottom direction of the imaging apparatus.

9. A sensor structure of an image shake correcting device, comprising:
   a support member;
   a vibration damping member disposed on the support member; and
   a detection member including a sensor part that detects information related to an image shake,
   wherein the vibration damping member has a hole portion and/or a plurality of thick portions having different thicknesses in a first direction, and
   the vibration damping member is disposed such that at least a part of the vibration damping member overlaps a part of the sensor part in a projection direction of the part of the sensor part,
   wherein the sensor part includes:
      a first sensor part that detects information related to the image shake in a roll direction;
      a second sensor part that detects information related to the image shake in a pitch direction; and
      a third sensor part that detects information related to the image shake in a yaw direction.

10. The sensor structure of an image shake correcting device according to claim 9,
    wherein the vibration damping member is disposed to overlap the first sensor part in a first projection direction, which is a projection direction of the first sensor part.

11. The sensor structure of an image shake correcting device according to claim 9,
    wherein the support member includes:
       a first plane on which the first sensor part is disposed and which is parallel to the roll direction;
       a second plane on which the second sensor part is disposed and which is orthogonal to the first plane and parallel to the pitch direction; and
       a third plane on which the third sensor part is disposed and which is orthogonal to the first plane and parallel to the yaw direction.

12. The sensor structure of an image shake correcting device according to claim 11,
    wherein the detection member includes:
       a first mounting portion on which the first sensor part is mounted and which is disposed parallel to the first plane;

a second mounting portion on which the second sensor part is mounted and which is disposed parallel to the second plane; and a third mounting portion on which the third sensor part is mounted and which is disposed parallel to the third plane.

13. The sensor structure of an image shake correcting device according to claim 12, wherein the detection member has a relay portion that connects the first mounting portion and the second mounting portion and/or connects the first mounting portion and the third mounting portion.

14. The sensor structure of an image shake correcting device according to claim 13, wherein, in the detection member, the relay portion is disposed at a position passing through the hole portion.

\* \* \* \* \*